(12) United States Patent
Tsuji et al.

(10) Patent No.: US 9,870,161 B2
(45) Date of Patent: Jan. 16, 2018

(54) COMPUTATION PROCESSING DEVICE AND CONTROL METHOD THEREOF

(71) Applicant: NEC CORPORATION, Tokyo (JP)

(72) Inventors: Yukihide Tsuji, Tokyo (JP); Yukikazu Nakamoto, Hyogo (JP)

(73) Assignee: NEC CORPORATION, Tokyo (JP)

( * ) Notice: Subject to any disclaimer, the term of this patent is extended or adjusted under 35 U.S.C. 154(b) by 21 days.

(21) Appl. No.: 14/777,690

(22) PCT Filed: Mar. 24, 2014

(86) PCT No.: PCT/JP2014/059381
§ 371 (c)(1),
(2) Date: Sep. 16, 2015

(87) PCT Pub. No.: WO2014/157712
PCT Pub. Date: Oct. 2, 2014

(65) Prior Publication Data
US 2016/0274804 A1    Sep. 22, 2016

(30) Foreign Application Priority Data
Mar. 25, 2013  (JP) ................................. 2013-061982

(51) Int. Cl.
*G06F 3/06* (2006.01)
*G06F 1/32* (2006.01)
(Continued)

(52) U.S. Cl.
CPC .............. *G06F 3/0619* (2013.01); *G06F 1/24* (2013.01); *G06F 1/26* (2013.01); *G06F 1/3203* (2013.01);
(Continued)

(58) Field of Classification Search
CPC .... G06F 3/0619; G06F 1/3287; G06F 9/4401; G06F 1/3225; G06F 3/0625;
(Continued)

(56) References Cited

U.S. PATENT DOCUMENTS

2010/0058046 A1    3/2010  John et al.
2011/0173466 A1*   7/2011  Tanaka .................. G06F 1/3228
                                                    713/310
(Continued)

FOREIGN PATENT DOCUMENTS

JP    5-66951 A    3/1993
JP    10-40220 A   2/1998
(Continued)

OTHER PUBLICATIONS

Ryusuke Nebashi, et al., "Investigation of stand-by power free electric system using non-volatile CPU", IPSJ SIG Notes. EMB, Embedded Systems, Feb. 24, 2012, pp. 1-6, EMB-24(25).
(Continued)

*Primary Examiner* — Reginald Bragdon
*Assistant Examiner* — Mehdi Namazi
(74) *Attorney, Agent, or Firm* — Sughrue Mion, PLLC

(57) ABSTRACT

In order to ensure that a normally-off computer connected to a volatile component operates normally and rapidly after operation of turning-on/off of a power supply is executed, a computation processing device which has nonvolatile registers and which is able to continue processing of data retained in the device after the power supply is turned off/on without retracting the data to an external device includes at least: a central processing unit including the nonvolatile registers; a connection unit for a volatile component which saves internal information in a volatile storage element thereof; a nonvolatile storage unit for saving a return program from a power-off state of the volatile component; and
(Continued)

an inspection unit notifying that a potential of the power supply in the computation processing device has reached an operation potential at a time of return. The central processing unit loads the return program from the nonvolatile storage unit in response to a notification signal from the inspection unit and executes it.

13 Claims, 6 Drawing Sheets

(51) Int. Cl.
　　*G06F 9/44*　　　　(2006.01)
　　*G06F 1/24*　　　　(2006.01)
　　*G06F 1/26*　　　　(2006.01)
　　*G06F 11/14*　　　(2006.01)

(52) U.S. Cl.
　　CPC .......... *G06F 1/3225* (2013.01); *G06F 1/3287* (2013.01); *G06F 3/0625* (2013.01); *G06F 3/0647* (2013.01); *G06F 3/0653* (2013.01); *G06F 3/0685* (2013.01); *G06F 9/4401* (2013.01); *G06F 11/1441* (2013.01); *Y02B 60/1282* (2013.01); *Y02B 60/32* (2013.01)

(58) Field of Classification Search
　　CPC .... G06F 3/0647; G06F 3/0653; G06F 3/0685; Y02B 60/1282; Y02B 60/32
　　See application file for complete search history.

(56) References Cited

U.S. PATENT DOCUMENTS

| | | | |
|---|---|---|---|
| 2013/0219203 A1* | 8/2013 | Fujisaki | G06F 1/3206 713/323 |
| 2014/0138675 A1* | 5/2014 | Yamazaki | H01L 29/66757 257/43 |
| 2015/0193354 A1* | 7/2015 | Kwon | G06F 12/1027 711/207 |
| 2016/0055030 A1* | 2/2016 | Kanai | G06F 9/485 710/6 |

FOREIGN PATENT DOCUMENTS

| | | |
|---|---|---|
| JP | 2002-182803 A | 6/2002 |
| JP | 2004-133969 A | 4/2004 |
| JP | 2006-92481 A | 4/2006 |
| JP | 2010-86407 A | 4/2010 |
| JP | 2010-140325 A | 6/2010 |
| JP | 2012-174031 A | 9/2012 |

OTHER PUBLICATIONS

International Search Report of PCT/JP2014/059381, dated Jun. 3, 2014. [PCT/ISA/210].
Written Opinion of PCT/JP2014/059381, dated May 21, 2014. [PCT/ISA/237].
Communication dated Aug. 23, 2017, issued by the Japanese Patent Office in counterpart application No. 2015-508820.
Nomura, "Next-Generation Normally-Off Processor using MRAM", Proceedings of the 2012 IEICE General Conference, Electronics 2, Japan, Institute of Electronics, Information and Communication Engineers , Mar. 6, 2012, p. 78 (9 pages total).
Communication dated Nov. 1, 2017, from Japanese Patent Office in counterpart application No. 2015-508820.

* cited by examiner

COMPUTATION PROCESSING DEVICE AND CONTROL METHOD THEREOF

CROSS REFERENCE TO RELATED APPLICATIONS

This application is a National Stage of International Application No. PCT/JP2014/059381 filed Mar. 24, 2014, claiming priority based on Japanese Patent Application No. 2013-061982, filed Mar. 25, 2013, the contents of all of which are incorporated herein by reference in their entirety.

TECHNICAL FIELD

This invention relates to a method of returning from a tuning-off of a power supply in a computation processing device (a normally-off computer) in a case where a volatile component saving internal information in a volatile memory element thereof is connected to the computation processing device (the normally-off computer) which is implemented by nonvolatile elements.

BACKGROUND ART

In recent years, with improving the scale of integration of semiconductor, power consumption due to leakage currents in transistors when a circuit does not operate becomes an issue. Hence, a semiconductor integrated circuit having a low consumption power mode, which decreases the leakage currents by turning a power supply of the circuit off when the semiconductor integrated circuit is not used, has been developed.

However, when a supply of the power supply is stopped, in the semiconductor integrated circuit, an internal state thereof is cancelled exclusive of nonvolatile memories.

Therefore, it is necessary to retract held data to an external storage device or the like in advance of turning-off of the power supply. For example, a computer system described in Patent Literature 1 discloses a method of keeping a state of its components and a resumption function thereof after a power supply is disconnected completely. The computer system disclosed in Patent Literature 1 uses a nonvolatile storage device being external of a computer system core that stores status information for a suspend/resume function. The computer system disclosed in Patent Literature 1 reads an internal state by using a scanning latch in components of the computer system. The read internal state is saved in a retraction storage area and the power supply is disconnected.

In addition, Patent Literature 2 discloses a "computer system" which saves, by a request of a user, contents of a memory needed for return, information on an input/output device and whatnot into an external storage device and which returns them if necessary.

Patent Literature 3 discloses an "information processing unit" which is capable of improving stability of a system by solving mismatching of device management information before suspend processing and after resume processing. The information processing unit disclosed in Patent Literature 3 includes, as hardware, a CPU, a main memory, a nonvolatile memory, an interface section, expansion devices, a user interface section, and a bus. A suspend processing program, a resume processing program, a device management table and so on are stored in the nonvolatile memory. Before this system end, the suspend processing program saves at least the contents of the main memory to which a program has been loaded in the nonvolatile memory as suspend data. When the system starts, the resume processing program restores the suspend data saved in the nonvolatile memory to the main memory, detects one or more extension devices connected to the interface section, compares the detection result with the device management table, and deletes, from the device management table, device identification information of the extension device which exists only in the device management table.

Patent Literature 4 discloses a "semiconductor device" which is transferable at a high speed to a standby mode where power consumption is reduced while keeping internal information. The semiconductor device described in Patent Literature 4 comprises a latch circuit including a nonvolatile memory and a writing circuit, and is characterized by writing volatile data of the latch circuit in the nonvolatile memory in advance of turning-off of a power supply. The semiconductor device described in Patent Literature 4 can save data rapidly without requiring a complex transfer operation by adding nonvolatile memory cells.

Patent Literature 5 discloses a "portable terminal" which can provide comfortable operation environment by eliminating power disconnection immediately after starting. The portable terminal described in Patent Literature 5 comprises a main control part consisting of a CPU and an input/output device, a ROM storing a program for operating the main control part, a RAM storing a user application program, a main battery serving as a driving power source, a power-supply switch turning the power supply from the main battery on/off, and a voltage detection part detecting a voltage of the main battery to send voltage data to the main control part. The main control part executes the user application when the voltage of the main buttery becomes not less than a prescribed voltage within a predetermined time interval after turning-on power, and turns the power-supply switch off unless the voltage of the main battery becomes not less than the prescribed voltage within the predetermined time interval.

PRIOR ART LITERATURE

Patent Literature

Patent Literature 1: JP-A-2002-182803
Patent Literature 2: JP-A-H05-066951
Patent Literature 3: JP-A-2012-174031
Patent Literature 4: JP-A-2004-133969
Patent Literature 5: JP-A-H10-040220

SUMMARY OF THE INVENTION

Problems to be Solved by the Invention

In a case of using the memory element disposed at a distance from a circuit portion holding internal state as the above-mentioned Patent Literature 1, a time delay and power consumption with data transfer occur. In particular, in Patent Literature 1, the time delay and the power consumption with data transfer become large in a case where the turning-on/off of the power supply is carried out with a high frequency.

In the computer system disclosed in the above-mentioned Patent Literature 2, inasmuch as the central processing unit and the memory are constructed of volatile elements, it must save contents of the memory into the external storage device and return if necessary. Consequently, as with the above-mentioned Patent Literature 1, in Patent Literature 2 also, the time delay and the power consumption with data transfer become large in a case where the turning-on/off of the power supply is carried out with a high frequency.

In the information processing unit disclosed in the above-mentioned Patent Literature 3 also, it is necessary to save the contents of the main memory into the nonvolatile memory as the suspend data before the system ends and to return the suspend data saved in the nonvolatile memory into the main memory when the system starts. Consequently, as with the above-mentioned Patent Literatures 1 and 2, in Patent Literature 3 also, the time delay and the power consumption with data transfer become large in a case where the turning-on/off of the power supply is carried out with a high frequency.

In the semiconductor device disclosed in the above-mentioned Patent Literature 4 also, it is necessary to save volatile data into the nonvolatile memory when the power supply is turned off. Accordingly, in Patent Literature 4, power consumption with data transfer becomes large in a case where the turning-on/off of the power supply is carried out with a high frequency.

In the portable terminal disclosed in the above-mentioned Patent Literature 5, the CPU and the RAM are constructed of volatile elements. Then, the portable terminal disclosed in Patent Literature 5 merely detects the voltage of the main buttery, carries out initial processing for operating the user application program stored in the RAM if the detected voltage is not less than the prescribed voltage, and executes the user application program.

Under the circumstances, it is advanced development of an computation processing device which is capable of processing data continuously after operation of the turning-off/on of the power supply in a state where data in the possession within the computation processing device is not saved to an external device (e.g., a nonvolatile memory such as an external storage device) connected to the computation processing device in question. Herein, such as a computation processing device will be called a "normally-off computer" hereinafter. Such as a normally-off computer comprises a nonvolatile CPU including nonvolatile registers and a non-volatile memory. In this connection, the nonvolatile CPU may include volatile registers for holding data which may be lost when the power supply is turned off.

The normally-off computer is an effective device achieving a power saving system because it is possible to suppress a leakage current by turning the power supply off in a case of no computation processing. For example, in a terminal operating at a buttery such as a sensor device, it is important to reduce a changing frequency of the buttery in a respect of maintenance and a standby time interval of the sensor device is very long in comparison with an operation time interval thereof. For this reason, it is a large power saving effect by turning the power supply off on being not in use and it is most amenable to use the normally-off computer as the terminal.

Ideally, it is desirable to make the normally-off computer by exchanging all volatile elements of hardware (the device) realizing the system with nonvolatile elements. However, inasmuch as actual hardware is implemented by components and is used for general purpose, a plurality of devices (components) is used by mutually connecting them through standardized interfaces. Consequently, due to issues in which manufacturing processes are different from each component, all of components do not become specifications supported to the normally-off computer (supported to operation of turning on-off of the power supply).

Therefore, hardware having a large volume to cause a complicated control system to operate becomes a combined system in which normally-off computer compatible components and normally-off computer incompatible components are mixed as the plurality of devices (components).

In each normally-off computer compatible component, immediately after returning, a code resumes from before returning although the power supply is turned on and off at favorite timings during execution of a program. In comparison with this, in each normally-off computer incompatible component, set information is forgotten by operation of turning-off of the power supply. Accordingly, in the above-mentioned combined system, there is a possibility that the whole of the system causes an error when it makes access from the normally-off computer compatible component to the normally-off computer incompatible component after returning because transmission/reception of erroneous data is carried out.

It is an object of the present invention to provide a technique for ensuring that a normally-off computer connected to a volatile component (a normally-off computer incompatible component) operates normally and at a high-speed even after operation of turning-on/off of a power supply is carried out.

Means to Solve the Problem

A computation processing device according to this invention is a computation processing device which comprises nonvolatile registers and which is able to continue processing data retained in the device after a power supply is turned off/on without retracing the data to an external device, wherein the computation processing device comprises at least: a central processing unit including the nonvolatile registers; a connection unit for a volatile component which saves internal information in a volatile storage element thereof; a nonvolatile storage unit that saves a return program to resume from a power-off state of the power supply in the volatile components; and an inspection unit that notifies that a potential of the power supply in the computation processing device has reached an operation potential at time of return. The central processing unit loads the return program from the nonvolatile storage unit in response to a notification signal from the inspection unit and executes it.

Effect of the Invention

It is possible to ensure that a normally-off computer operates normally and at a high-speed even after operation of turning-on/off of a power supply is carried out.

MODES FOR EMBODYING THE INVENTION

Related Art

In order to facilitate the understanding the present invention, the related art will be explained.

Figure 1:
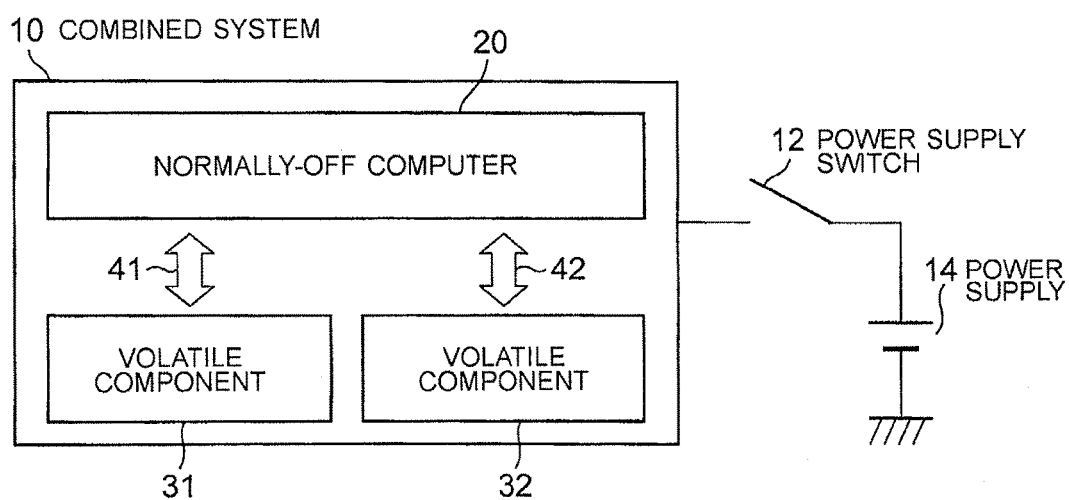
FIG. 1 is a block diagram showing a related combined system including a normally-off computer connected to volatile components.

FIG. 1 is a block diagram showing a related combined system 10 in which a normally-off computer compatible component and normally-off computer incompatible components are mixed.

The combined system 10 is connected to a power supply 14 through a power supply switch 12. The illustrated combined system 10 comprises a normally-off computer 20 and first and second volatile components 31 and 32. The normally-off computer 20 and the first and the second volatile components 31 and 32 are mutually connected through first and second connection units 41 and 42, respectively.

Although a drawing is not made, the normally-off computer 20 comprises a CPU including registers and a memory. In the normally-off computer 20, all of the registers in the CPU and the memory are composed of nonvolatile elements.

In comparison with this, each of the first and the second volatile components is composed of the normally-off computer incompatible components including volatile elements as hardware (a device).

In the manner which is described above, in the normally-off computer 20, immediately after returning, a code resumes from before returning although the power supply thereof is turned on or off at favorite timings during execution of a program. On the other hand, in the first and the second volatile components 31 and 32 serving as the normally-off computer incompatible components, set information is forgotten by operation of turning-off of the power supply. Accordingly, in the combined system 10, there is a possibility that the whole of the system causes an error when it makes access from the normally-off computer 20 to the normally-off computer incompatible components 31 and 32 after returning because transmission/reception of erroneous data is carried out.

The present invention is a technique for ensuring that a normally-off computer connected to a volatile component (a normally-off computer incompatible component) operates normally and at a high-speed even after operation of turning-on/off of a power supply is carried out.

Exemplary Embodiment

Now, the description will proceed to an exemplary embodiment of this invention.

A computation processing device according to an exemplary embodiment of this invention is a computation processing device which comprises nonvolatile registers and which is able to continue processing data retained in the device after a power supply is turned off/on without retracting the data to an external device.

The computation processing device according to the exemplary embodiment of this invention comprises at least: a central processing unit including the above-mentioned nonvolatile registers; a connection unit for a volatile component which saves internal information in a volatile storage element thereof; a nonvolatile storage unit that saves a return program to resume from a power-off state of the power supply in the volatile component; and an inspection unit that notifies that a potential of the power supply in the computation processing device has reached an operation potential at a time of return. Then, the central processing unit loads the return program from the nonvolatile storage unit in response to a notification signal from the inspection unit and executes it. Specifically, the central processing unit executes based on the return program from a turning-off point of a power supply switch (hard) to an initial code.

In this connection, inasmuch as the computation processing device may can process data continuously after operation of the turning-off/on of the power supply, the central processing unit may include volatile registers for storing data nothing wrong with destroying when the power supply is turned off.

The computation processing device may comprise a plurality of the above-mentioned connection units for volatile components which save internal information in volatile elements thereof. In order to reduce a component count (amount of information; storage capacity) of the nonvolatile storage unit, a plurality of return programs corresponding to a plurality of volatile components connected thereto may be shared in the nonvolatile storage unit in number less than the volatile components connected thereto.

In the computation processing device according to the exemplary embodiment of this invention, the above-mentioned central processing unit can execute different processing by rewriting instructions and data saved in the nonvolatile storage unit and thereby enhancing general purpose use as the computation processing device. Further, the computation processing device may desirably comprise two or more central processing units. In a case of such a configuration, while one central processing unit execute the return program in response to the notification signal from the inspection unit, central processing units other than this may resume execution of codes which are suspended before returning. Hence, it is possible to reduce a return time.

In addition, the computation processing device according to the exemplary embodiment of this invention may comprise a transferring unit having a function for transferring data. In this case, responsive to a signal, from the inspection unit, which notifies that the potential of the power supply has reached the operation potential, the transferring unit autonomously transfers data stored in the nonvolatile storage unit to the connection units for the volatile components. In the meantime, the central processing unit may concurrently resume codes suspended before retuning during execution of the above-mentioned return program. In this case also, it is possible to reduce a return time.

The above-mentioned connection unit for the volatile component may have an input terminal which receives an output signal notifying of an operation voltage within the volatile component or that the operation voltage of the volatile component has reached a predetermined threshold voltage. With such a configuration, the central processing unit prohibits access to the nonvolatile component and execution of the return program for the duration where the operation voltage within the volatile component does not reach the predetermined threshold voltage. It is effective prevention of erroneous access in a case of connecting the volatile component where the rise time of the operation voltage is slower than that of the computation processing device.

In a case where execution of the return program and execution of the codes suspended before returning are concurrently proceeded, the computation processing device according to the exemplary embodiment of this invention may comprise a monitoring unit that monitors an executing state of the return program. In this case, the central processing unit prohibits accessing the volatile component which is scheduled to execute or executes the return program after turning-off of the power supply without access necessary to execution of the return program until the time when the central processing unit receives, from the monitoring unit, a signal indicative of completion of execution of the return program. Thus, it is possible to prevent data from transmitting/receiving between the volatile component and the computation processing device ahead of a return completion of the volatile component.

Furthermore, the computation processing device according to the exemplary embodiment of this invention may comprise a detection unit that notifies that execution of the return programs reaches completion entirely. In this case, the central processing unit can do not resume the processing where it executes before turning-off of the power supply until the time when the central processing unit receives, from the detection unit, a signal notifying that execution of the return program reaches completion. In a case where a requirement for an activation time (responsivity) is not tight, it is not necessary to successively grasp the return state of the volatile component and a control circuit or a control program is simplified.

A method of controlling the computation processing device according to the exemplary embodiment of this invention may comprise: saving, in the nonvolatile storage unit, a plurality of return programs for one volatile component in accordance with a state of return; and selectively loading and executing, in the central processing unit, a specific return program from the plurality of return programs in accordance with a state of return. Hence, it is possible to achieve speedup of returning and a power saving by omitting overlapped return programs.

In addition, in a case where there is a plurality of connection units connected thereto, a method of controlling the computation processing device according to an exemplary embodiment of this invention comprises: saving, in the nonvolatile storage unit, a plurality of return programs $P(i, j)$ for a volatile component i in accordance with a state j of return, a plurality of return programs $P(k, l)$ for another component k in accordance with a state l of return, and a whole state control program, for a state of the computation processing device to be returned, that selects and controls one return program for returning each volatile component into a suitable state; and loading and executing, in the central processing unit, the whole state control program from the nonvolatile storage unit at a time of return. In this connection, in the method of controlling the computation processing device according to the exemplary embodiment, at a time of return, the central processing unit selects, in accordance with a result of the return program $P(i, j)$ for the volatile component i that previously executes, an optimum return program from the plurality of return programs $P(k, l)$ for the other volatile component k.

The method of controlling the computation processing device according to the exemplary embodiment of this invention may comprise: saving, in the nonvolatile storage unit, return programs assigned with priorities in accordance with states of return of the respective return programs; and loading and executing, in the central processing unit, the return programs from the nonvolatile storage unit in accordance with the priorities at a time of return. According to such a configuration, it is possible to omit unnecessary return program to return the volatile component k by selecting the return programs $P(k, l_1)$, $P(k, l_2)$, . . . , for the other volatile component k in accordance with acquisition of data after returning that can acquire from a nonvolatile component i and it is therefore possible to achieve speedup of returning and a power saving.

Now, the description will proceed to difference between the computation processing device according to the exemplary embodiment of this invention and computation processing devices such as CPUs disclosed in the above-mentioned Patent Literatures 1-5.

Each of the computation processing devices disclosed in Patent Literatures 1-5 comprises a computation processing device such as a CPU composed of volatile registers.

In comparison with this, the exemplary embodiment of this invention is an invention related to return technique for the computation processing device comprising nonvolatile registers. The computation processing device comprising the nonvolatile registers in itself does not save in a nonvolatile memory a return program such as suspend processing, resume processing, and so on. This is because, the computation processing device according to the exemplary embodiment can continuously execute operation before an turning-off of a power supply as if nothing had happened for turning-on/off of the power supply without retracting processed data.

More specifically, the exemplary embodiment of this invention is technique related to the computation processing device comprising the nonvolatile registers and technique so that the computation processing device comprising the nonvolatile registers normally operates (no system error occurs) even if it is used to a "combined system" in which a volatile component including nonvolatile registers is connected thereto.

Example 1

Figure 2:
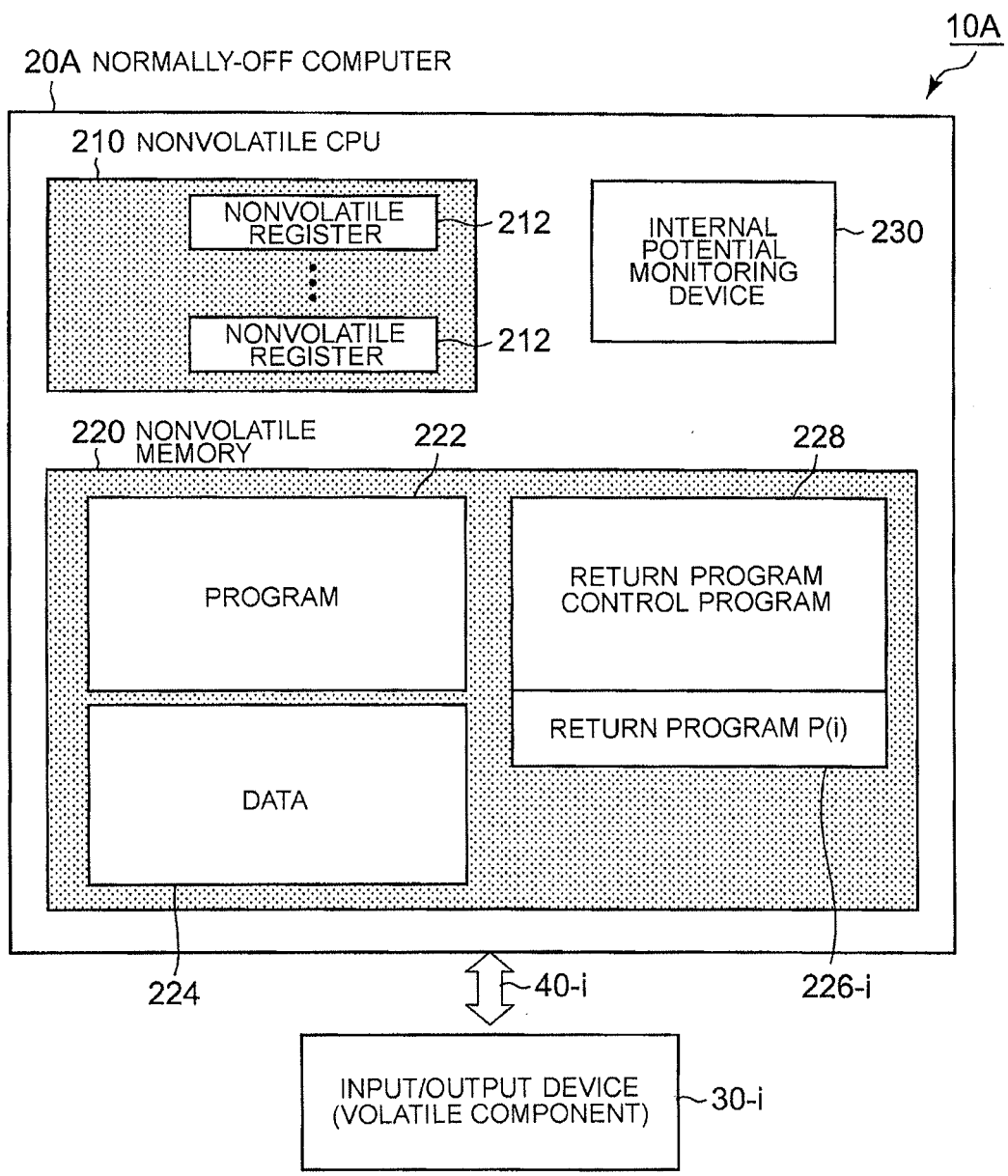
FIG. 2 is a block diagram showing a normally-off computer according to a first example of this invention, to which a combined system together with a volatile component is enable.
Figure 3:
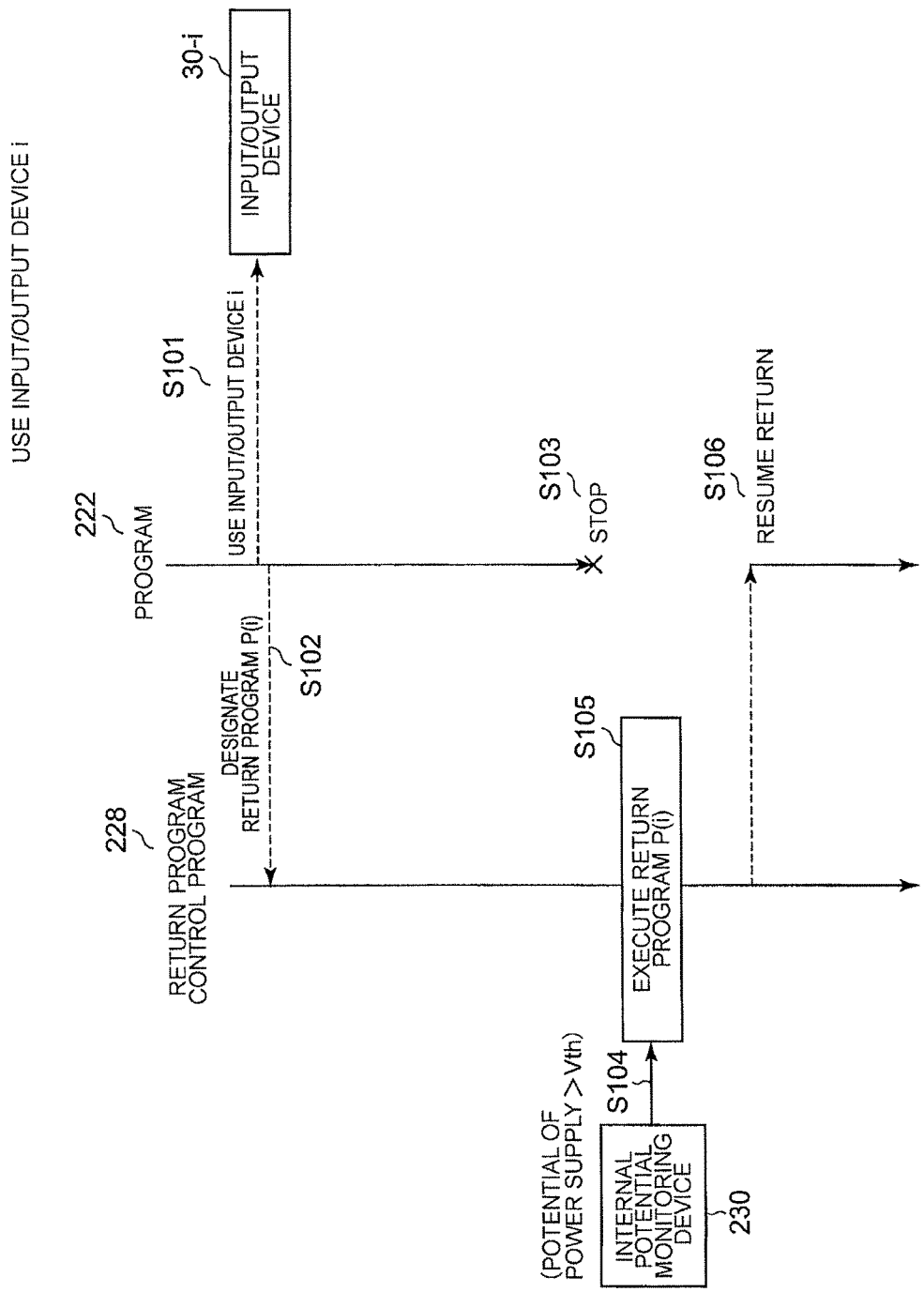
FIG. 3 is a sequence view for use in describing a method of controlling the normally-off computer illustrated in FIG. 2, to which the combined system together with the volatile component is enable.

Referring to FIGS. 2 and 3, the description will proceed to a computation processing device (a normally-off computer) 20A according to a first example of this invention.

FIG. 2 is a block diagram showing the normally-off computer 20A which is used a combined system 10A which is enable to combine with a volatile component 30-i. FIG. 3 is a sequence view for use in describing a method of controlling the normally-off computer 20A.

The normally-off computer 20A includes nonvolatile registers and can continuously process data after operation of turning-on/off of a power supply without retracting data held within the device to an external device. The normally-off computer 20A includes a nonvolatile CPU 210 and a nonvolatile memory 220. In the example being illustrated, the nonvolatile CPU 201 comprises a plurality of nonvolatile registers 212 without including any volatile register. However, the nonvolatile CPU 210 may include volatile registers (not shown) for holding data nothing wrong with losing when the power supply is turned off.

The normally-off computer 20A comprises a connection unit 40-i for the volatile component 30-i. In the example being illustrated, the volatile component 30-i comprises an input/output device.

The nonvolatile memory 220 stores a program 222, data 224, a return program 226-i from a turning-off state of the power supply of the volatile component 30-i, and a return program control program 228.

Accordingly, the nonvolatile memory 220 serves as a nonvolatile storage unit for saving the return program 226-*i* from the turning-off state of the power supply of the volatile component 30-*i*.

The normally-off computer 20A further comprises an internal potential monitoring device 230. The internal potential monitoring device 230 serves as a power supply voltage monitoring circuit (an inspection unit) for detecting (notifying) that a potential of the power supply in the normally-off computer 20A has reached an operation potential at a time of return. The nonvolatile CPU 210 of the normally-off computer 10A loads, in response to a notification signal from the power supply voltage monitoring circuit (the inspection unit) 230, the return program control program 228 (the return program 226-*i*) of the volatile component (the input/output device) 30-*i* from the nonvolatile memory 220 and executes it.

That is, the nonvolatile CPU 210 acts as a central processing unit for loading the return program 226-*i* from the nonvolatile storage unit 220 in response to the notification signal from the inspection unit 230 and executes it.

In the example being illustrated, the normally-off computer 20A is connected to an LCD (liquid crystal display) of a display device as the nonvolatile component (the input/output device) 30-*i*. In addition, a power supply source for the LCD 30-*i* is in common with the normally-off computer 20A.

In the LCD 30-*i*, conditions such as brightness of display and resolution are stored in volatile registers (not shown). The LCD 30-*i* carries out, for the outside, setting of the volatile registers and transmission/reception of display data via a serial communication such as a UART (Universal Asynchronous Receiver Transmission) or the like. When the power supply is turned off, the LCD 30-*i* loses a setting condition of a screen set before the power supply is turned off and goes back to set of default.

In addition, a device in which setting information such as operation conditions is held in registers comprising nonvolatile storage elements as described above will be called a "volatile device" herein. Accordingly, in the example being illustrated, the volatile component (the input/output device) 30-*i* comprises the volatile device.

Referring now to FIG. 3 in addition to FIG. 2, the description will proceed to a controlling method of controlling the normally-off computer 20A.

It will be herein presumed that the input/output device 30-*i* is indicated with an "input/output device i" and the return program 226-*i* from the turning-off state of the power supply of the input/output device 30-*i* is indicated with a "return program P(i)".

As shown in FIG. 3, the program 222 loaded in the nonvolatile CPU 210 uses the input/output device i (step S101), and designates the return program P(i) (step S102). In other words, the program 222 defines the return program for the input/output device i as the return program P(i) in the nonvolatile memory 220 in the normally-off computer 20A.

A user turns off the power supply of the whole of the combined system 10A comprising the normally-off computer 20A and the volatile device 30-*i* externally connected thereto at any timings when the user does not use it, and cuts down standby power. Hence, the program 222 comes to a stop (step S103).

Moreover, the user turns on the power supply of the combined system 10A to resume processing when the user uses it.

When the normally-off computer 20A is put from the turning-off state of the power supply into a turning-on state of the power supply, the internal potential monitoring device (the power supply voltage monitoring circuit) 230 detects that the potential of the power supply of the normally-off computer 20A has reached an operation potential Vth (step S104). Making this detection as a trigger, the return program control program 228 loaded in the nonvolatile CPU 220 executes the return program P(i) from the turning-off state of the power supply that is stored in the nonvolatile memory 220 (step S105) to return a state of the display device 30-*i* into a state before the power supply is turned off. On confirming completion of the return program control program 228 or after receiving a setting ready signal from the display device 30-*i* side, the program loaded in the nonvolatile CPU 210 resumes processing executed before the power supply is turned off (step S106).

In the manner which is described above, at a time of return of the normally-off computer 20A, the nonvolatile CPU 210 starts execution of the return program P(i) in response to a signal, from the internal potential monitoring device 230 within the normally-off computer 20A, notifying that a potential of the power supply has reached an operation potential Vth to make the state of the input/output device i return until just before stopping time. And then, after confirming the returning, the nonvolatile CPU 210 resumes a program code executed before the power supply is turned off.

In the manner which is described above, when the display device 30-*i* is accessed after resuming the processing executed, the normally-off computer 20A can continue the processing operation in a manner that the operation of turning-on/off of the power supply is not made although operation of the turning-off and the turning-on of the power supply of whole of the combined system 10A are carried out, because the above-mentioned display device 30-*i* is returned into a state similar to that before the power supply is turned off.

Accordingly, the user can turn off the power supply at any timing with peace of mind, and then it is possible to reduce a leakage current by turning off the power supply as often as possible when the user judges that the operation is not necessary to thereby achieving a power saving.

Now, the description will be proceed to advantageous effects of the first example of this invention.

Until resuming from a program code before coming a stop after returning from the turning-off of the power supply of the normally-off computer 20A, the normally-off computer 20A executes the resume program (the return program 226-*i*) in accordance with a characteristic of operation of the volatile component 30-*i* which cannot make nonvolatile. Therefore, the volatile component 30-*i* cannot make nonvolatile is put into a desired operation state or a standby state, transmission/reception of normal data is carried out between the normally-off computer 20A and the volatile component 30-*i* which cannot make nonvolatile after resuming. It is therefore possible to prevent the whole of the combined system 10A from causing an error due to mistaken transmission of data. Inasmuch as the resume program (the return program 226-*i*) for the volatile component 30-1 is stored in the nonvolatile memory 220 of the normally-off computer 20A, execution from returning is rapid and it does not fail a high-speed returning characteristic being a characteristic of the normally-off computer 20A even the combined system 10A.

Example 2

Figure 4:
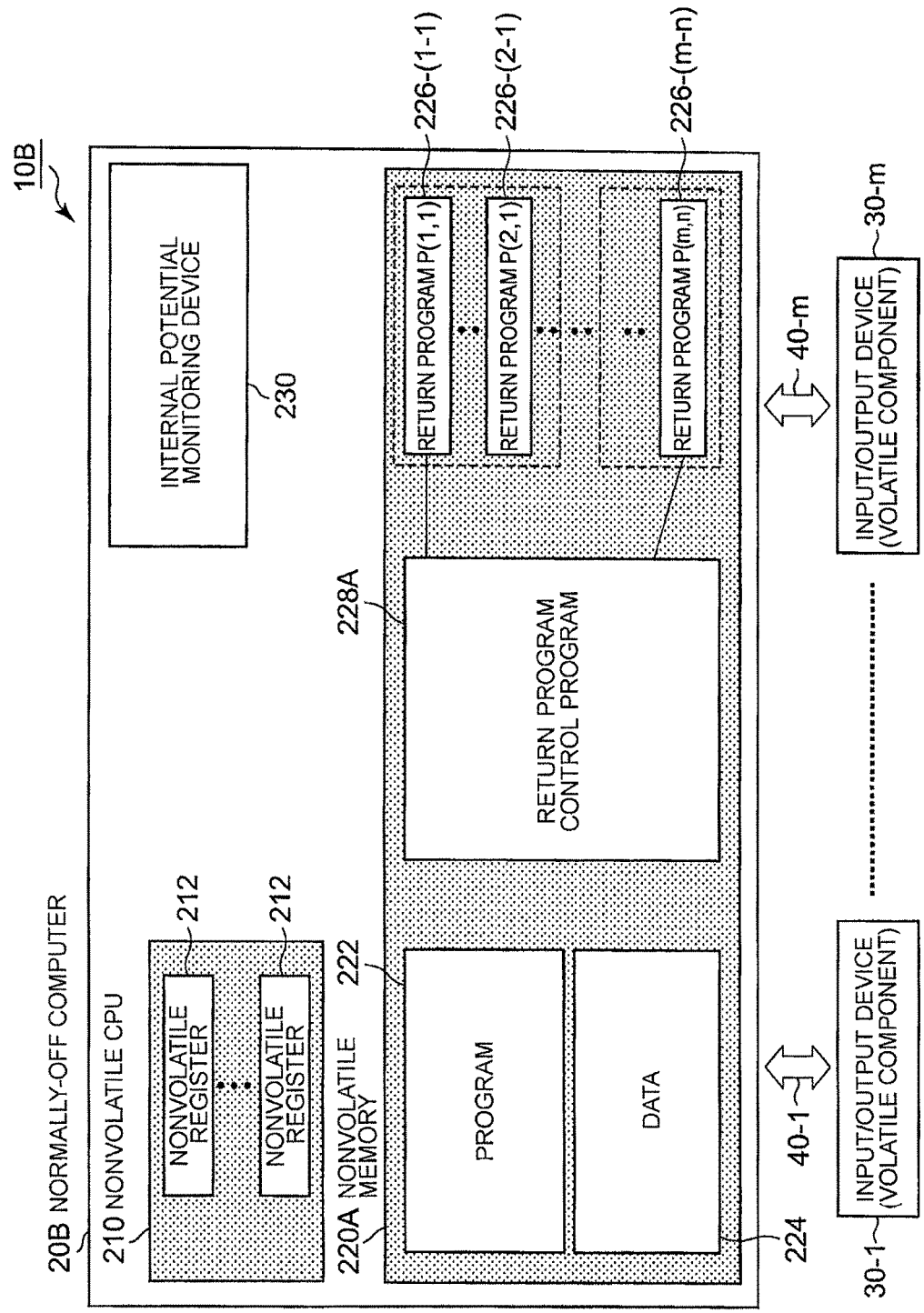
FIG. 4 is a block diagram showing a normally-off computer according to a second example of this invention, to which a combined system together with a plurality of volatile components is enable.
Figure 5:
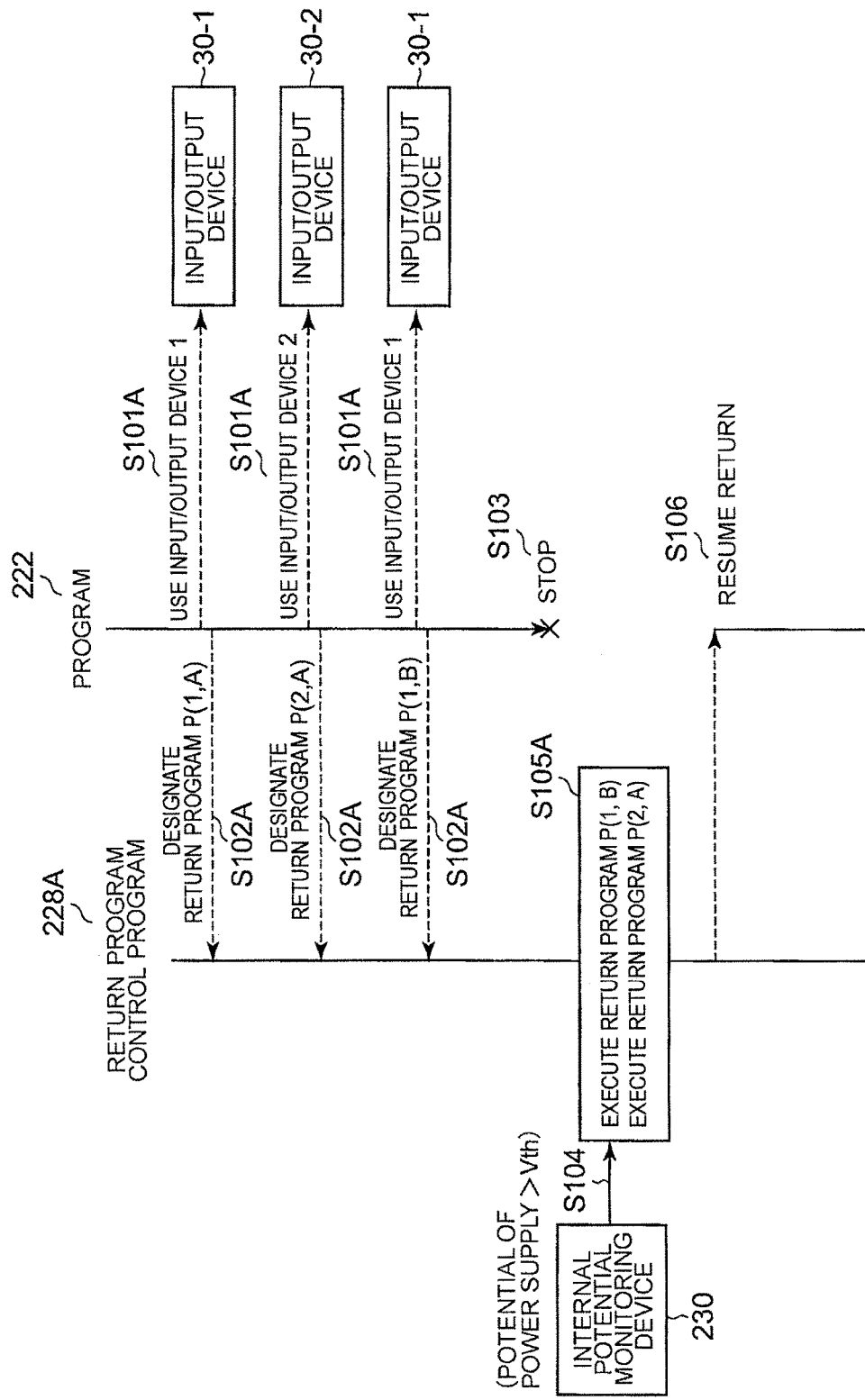
FIG. 5 is a sequence view for use in describing a method of controlling the normally-off computer illustrated in FIG. 4, to which the combined system together with the plurality of volatile components is enable.

Referring to FIGS. 4 and 5, the description will proceed to a computation processing device (a normally-off computer) 20B according to a second example of this invention.

FIG. 4 is a block diagram showing the normally-off computer 20B used to a combined system 10B which is able to combine to first through m-th volatile components 30-1 to 30-m, where m represents an integer which is not less than two. FIG. 5 is a sequence view for use in describing a controlling method of the normally-off computer 20B.

The normally-off computer 20B is connected to the first through the m-th volatile components 30-1 to 30-m through first through m-th connection units 40-1 to 40-m, respectively.

The illustrated normally-off computer 20B is similar in structure and operation to the normally-off computer 20A illustrated in FIG. 2 except that configuration of the nonvolatile memory is different from that illustrated in FIG. 2. Therefore, the nonvolatile memory is depicted at a reference sign of 220A. Hereafter, the similar reference signs are attached to those having functions similar to components illustrated in FIG. 2 and description of them will be omitted in order to simplify the description.

The nonvolatile memory 220A saves the program 222, the data 224, a plurality of return programs 226-(1-1), 226-(2-1), . . . , 226-(m-n) from a turning-off state of the power supply in the first through the m-th volatile components 30-1 to 30-m, and a return program control program 228A. In the example being illustrated, the plurality of return programs 226-(1-1), 226-(2-1), . . . , 226-(m-n) is distinctively indicated at return programs P(1, 1), P(2, 1), . . . , P(m, n), respectively.

Accordingly, the nonvolatile storage unit comprising the nonvolatile memory 220A saves a plurality of return programs P(i, j) for a volatile component i in accordance with a state j of return and a plurality of return programs P(k, l) for another volatile component k in accordance with a state l of return, where i≠k and j≠l.

The return program control program 228A serves as a whole state control program, for a state of the computation processing device 20B to be returned, that selects and controls one return program for returning each volatile component into a suitable state, in the manner which will later be described.

Accordingly, the nonvolatile storage unit 220A saves the plurality of return programs P(i, j), the plurality of return programs P(k, l), and the whole state control program 228A.

The central processing unit 210 loads the whole state control program 228A from the nonvolatile storage unit 220A at a time of return, and executes it. In the manner which will be later described, at a time of return, the central processing unit 210 selects, in accordance with a result of the return program P(i, j) for the volatile component i that previously executes, an optimum return program from the plurality of return programs P(k, l) for the other volatile component k.

In the following explanation, it will be assumed that m is equal to four and the combined system 10B comprises first through fourth volatile components 30-1, 30-2, 30-3, and 30-4. The first through the fourth volatile components 30-1 to 30-4 are also called first through fourth input/output devices, respectively, or first through fourth volatile devices, respectively.

Specifically speaking, the normally-off computer 20B is connected to, as the first through the fourth volatile devices 30-1 to 30-4, a communication device (a network device) for Internet connection having volatile setting registers, a positioning sensor (GPS), an LCD, and a heat type flow sensor, respectively. A power supply source for their modules is in common with the normally-off computer 30B.

In the first volatile device (the network device) 30-1, an IP (internet protocol) address is automatically set by a DHCP (Dynamic Host Configuration Protocol). The connected network device 30-1 acquires the IP address from a DHCP server on starting use of a network and turns back the IP address on completing. The network device 30-1 executes three steps: an initializing step 1 for ensuring setting of communication parameters on hardware and communication on a physical layer; a step 2 for acquiring the IP address by executing the DHCP; and a step 3 being an initialization setting of an application program.

It is necessary to acquire the IP address when the network device 30-1 is put into a turning-off state of the power supply for a long time from a time instant when the use of the network is completed and is returned into a turning-on state of the power supply from this. Therefore, the nonvolatile CPU 210 executes a return program P(1, A) for executing the step 2 and the step 3.

In a case where operation of the turning-off of the power supply and the turning-on of the power supply is carried out for a second time after a while, the IP address acquired by the DHCP by executing the step 2 is held in the nonvolatile memory 220A of the normally-off computer 20B. In a case where a time period between the turning-on of the power supply and the turning-off of the power supply for the second time, the IP address is effective on the network. Therefore, the network device 30-1 can return by a return program P(1, B) which does not executes the step 2.

Accordingly, the nonvolatile storage unit 220A saves a plurality of return programs P(1, A) and P(1, B) for the volatile component 30-1 in accordance with the state of return.

The nonvolatile CPU 210 performs a selection between the return program P(1, A) and the return program P(1, B) dependence on a time interval while the power supply of the network device 30-1 is turned off.

Accordingly, the nonvolatile CPU 210 selectively loads a specific return program from the plurality of return programs P(1, A) and P(1, B) in accordance with the state of return, and executes it.

The nonvolatile CPU 210 switches so as to select the return program P(1, B) as the specific return program when the time interval between the turning-off of the power supply and the turning-on of the power supply for the second time is shorter than a renewal cycle time interval of the IP address by the DHCP on the network and so as to select the return program P(1, A) as the specific return program when the time interval is longer than that. By doing in this way, it is possible to reduce processing of execution of unnecessary DHCP and it is therefore possible to achieve a power saving due to reduction of processing in the normally-off computer 20B and amount of communication.

As has been discussed, the central processing unit 210 selectively loads the specific return program from the plurality of return programs P(1, A) and P(1, B) that is able to return at the shortest time interval, and executes it.

Inasmuch as the positioning sensor (the second volatile device 30-2) is connected to the normally-off computer 20B, it assigns priorities to return programs P(1, A), P(1, B), and P(2, A) in advance so that the return program P(2, A) for the second volatile device 30-2 takes precedence over the return programs P(1, A) and P(1, B) for the first volatile device 30-1. And, when position information changes on turning-on of the power supply and the turning-off of the power supply for a single time and on turning-on of the power supply and the turning-off of the power supply for the second time, the return program P(2, A) is executed on a priority basis.

Inasmuch as the normally-off computer 20B detects a change of communication environment independently, it is possible to reduce the number of return due to rejection of the IP address or the like and it is therefore possible to reduce the power requirements.

In this manner, the nonvolatile storage unit 220A saves the return programs assigned with priorities in accordance with states of return of the respective resume programs. And then, the central processing unit 210 loads the return programs from the nonvolatile storage unit 220A in accordance with the priorities at a time of return, and executes them.

Furthermore, the LCD (the third volatile device 30-3) swaps data with the normally-off computer 20B through a UART. Although the UART can swap data by writing the data in transmission/reception registers (volatile registers), there is a surplus of computation resources such as the nonvolatile CPU 210 during a write-in operation and a read-out operation for the transmission/reception registers (the nonvolatile registers). Accordingly, the nonvolatile CPU 210 executes return processing for other volatile devices in parallel in a time division fashion, thereby encouraging rapid returning.

The heat type flow sensor (the fourth volatile device 30-4) requires an idling time interval (a time interval required until the time when a heater rises in temperature) to some extent at a time of return. Accordingly, a return standby time interval occurs other than when transmitting and setting set parameters for the flow sensor 30-4 in accordance with the return program control program 228A.

Accordingly, for the idling time interval also, the computation resources such as the nonvolatile CPU 210 are used to execution of the return programs for other volatile devices. Especially, inasmuch as the idling time interval is longer than a setting time interval of control parameters by resuming and there is a plurality of volatile devices required to return, the nonvolatile CPU 210 executes the return program of the flow sensor 30-4 prior to the return programs of the other volatile devices. From this fact, it is possible to shorten a time interval required from starting return until all of required volatile devices recover.

In this way, the central processing unit 210 loads the return program P(i, j) for the volatile component i (in this example, the flow sensor 30-4) that has the longest return time interval on a priority basis at a time of return, and executes it.

Although the plurality of volatile devices 30-1 to 30-4 comprises the communication device for Internet connection, the positioning sensor (GPS), the LCD, and the heat type flow sensor in the second example, kinds of volatile devices connected are not limited thereto. When the program 222 accesses each volatile device 30-$i$ (1≤i≤m), information required to return on accessing may be stored in the nonvolatile memory 220A as information for returning to the return program P(i).

In this connection, in a case where information required to return the volatile device 30-$i$ (that will be called return information hereafter) is different from each other according to a return condition (j), the return information is stored in the nonvolatile memory 220A as return program P(i, j). The return information (the return program) may be retrieved with index by labelling with i and j.

As shown in FIG. 5, procedural steps of the first volatile device 30-1 and the second volatile device 30-2 at a time of return are designated as the return program P(1, A), the return program P(1, B), and the return program P(2, A), respectively (step S101A), a single optimum return program P(1, $x$) ($x$ is A or B) is selected so as to match a state at a time or return for the first input/output device 30-1, and execution step of the return program P(1, $x$) and the return program P(2, A) may be optimized so as to match the state at a time of return and a return characteristic of a device.

Now, the description will be proceed to advantageous effects of the second example of this invention.

Until resuming from a program code before coming a stop after returning from the turning-off of the power supply of the normally-off computer 20B, the normally-off computer 20B executes the resume program (the return program) in accordance with a characteristic of operation of the plurality of volatile components 30-1 to 30-$m$ which cannot make nonvolatile. Therefore, the plurality of volatile components 30-1 to 30-$m$ which cannot make nonvolatile is put into a desired operation state or a standby state, transmission/reception of normal data is carried out between the normally-off computer 20B and the plurality of volatile components 30-1 to 30-$m$ which cannot make nonvolatile after resuming. It is therefore possible to prevent the whole of the combined system 10B from causing an error due to mistaken transmission of data. Inasmuch as the resume programs (the return programs) of the plurality of volatile components 30-1 to 30-$m$ are stored in the nonvolatile memory 220A of the normally-off computer 20B, execution from return is rapid and it does not fail a high-speed return characteristic being a characteristic of the normally-off computer 20B even the combined system 10B.

Example 3

Figure 6:
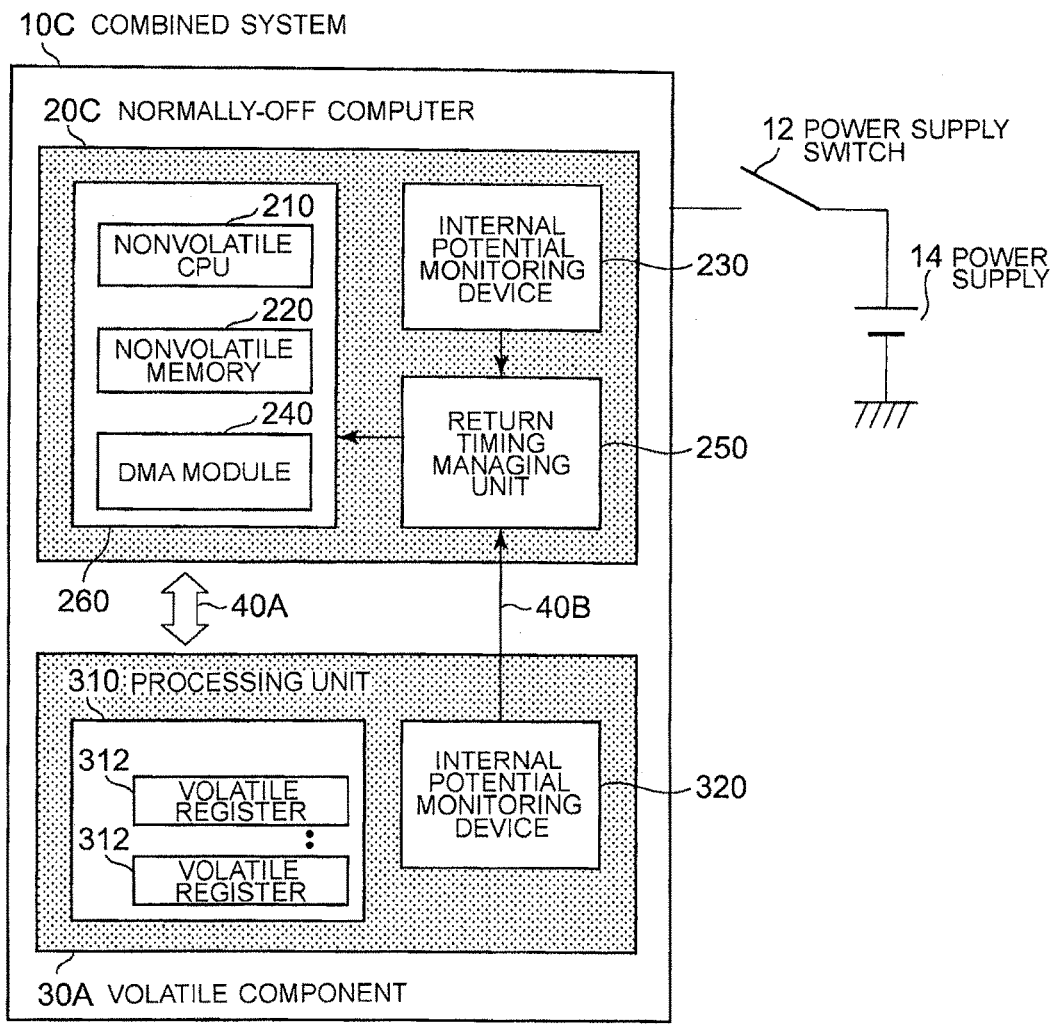
FIG. 6 is a block diagram showing a normally-off computer according to a third example of this invention that includes a return timing managing unit for controlling an execution timing of return means.

Referring to FIG. 6, the description will proceed to a computation processing device (a normally-off computer) 20 according to a third example of this invention.

FIG. 6 is a block diagram of a combined system 10C in which the normally-off computer 20C and a volatile component (a volatile device) 30A are mixed.

The similar reference signs are attached to those having functions similar to components illustrated in FIG. 2 and description of them will be omitted in order to simplify the description.

The normally-off computer 10C further comprises a DMA (Direct Memory Access) module 240 and a return timing managing unit 250 as well as the nonvolatile CPU 210, the nonvolatile memory 220, and the internal potential monitoring device 230. A combination of the nonvolatile CPU (the central processing unit) 210, the nonvolatile memory 220, and the DMA module 240 is called a processing unit 260.

The volatile component (the volatile device) 30A comprises a processing unit 310 and an internal potential monitoring device 320. The processing unit 310 includes a plurality of volatile registers 312. The volatile component 30A and the normally-off computer 20C are connected to each other through an interface 40A and an input port 40B. A combination of the interface 40A and the input port 40B serves as a connection unit. In the example being illustrated, the volatile component 30A comprises an output device such as an LCD.

The DMA module 240 serves as a transferring unit having a function for transferring data. Responsive to a signal, from the inspection unit 230, which notifies that the potential of the power supply has reached the operation potential, the transferring unit 240 autonomously transfers data stored in the nonvolatile storage unit 220 to the interface (the connection unit) 40A.

Inasmuch as return of the output device 30A such as the LCD is only output of set data from the normally-off computer 20C, interactive data communication is not required, and a return procedure (a return program) is simple. That is, the return is completed by only transmitting the set data from the normally-off computer 20C to the connection unit (the interface) 40A at a constant timing upon start-up thereof.

Hence, in the third example, the normally-off computer 20C comprises the DMA module 240 specializing data transfer, the data stored in the nonvolatile memory 220 is directly sent to the interface 40A by the DAM module 240 without using the nonvolatile CPU 210. As a result of this, it is possible to concurrently achieve economy of a memory area by downsizing the return program and reduction of executable power.

In addition, in preparation for a case where the volatile device 30A comprises the internal potential monitoring device (an operational potential monitor) 320, as shown in FIG. 6, the input port 40B for reading off its signal output and the return timing managing unit 250 for managing a signal from each internal potential monitor 230, 320 to control an execution timing of the return program are prepared within the normally-off computer 20C.

The return timing managing unit 250 serves as a monitoring unit that monitors an executing state of the return program. The central processing unit 210 prohibits accessing the nonvolatile component which is scheduled to execute or executes the return program after turning-off of the power supply without access necessary to execution of the return program until the time when the central processing unit 210 receives, from the monitoring unit 250, a signal indicative of completion of execution of the return program.

In addition, the return timing managing unit 250 serves as a detection unit that notifies that execution of the return program reaches completion entirely. The central processing unit 210 does not resume the processing where it executes before turning-off of the power supply until the time when the central processing unit 210 receives, from the detection unit 250, a signal notifying that execution of the return program reaches completion.

The input port 40B serves as a terminal which receives a signal notifying a state of an operation voltage in the volatile component 30A. This signal is sent to the nonvolatile CPU 210 through the return timing managing unit (the monitoring unit) 250. The nonvolatile CPU 210 prohibits access to the volatile component 30A whose operation voltage does not reach a predetermined threshold voltage and execution of the return program. Accordingly, the central processing unit 210 prohibits access to the volatile component 30A and execution of the return e program for the duration where the operation voltage within the volatile component 30A does not reach the predetermined threshold voltage.

In the third example, in a case where the operation voltage of the volatile component 30A is higher than that of the normally-off computer 20C or electric capacity (capacitance) of a power supply line is large due to a large bus size and in a case where an impedance in the power supply line does not lower sufficiently, it prevents erroneously accessing for the volatile component 30A where a rising edge of the operation voltage of the volatile component 30A becomes slower than that of the normally-off computer 20C.

For reference sake, the third example is effective similar to a case where the power supply sources are different between the normally-off computer 20C and the volatile device 30A.

In this connection, it will be assumed that the combined system 10C comprises a plurality of volatile devices 30A. In this case, the nonvolatile CPU 210 allocates, to the nonvolatile memory 220, a memory area for controlling and monitoring access for the respective volatile devices 30A and the nonvolatile CPU 210 inhibits access for the volatile device 30A where failure of access is set. Thus, in parallel with return by the DMA module 240, it is possible to resume execution of the program code which has been executed before returning from the turning-off of the power supply (due to the nonvolatile CPU 210) before all of the return of the volatile devices are completed, and it is therefore possible to improve a sensory speed of the return for a user.

Now, the description will be proceed to advantageous effects of the third example of this invention.

Until resuming from a program code before coming a stop after returning from the turning-off of the power supply of the normally-off computer 20C, the normally-off computer 20C executes the resume program (the return program) in accordance with a characteristic of operation of the volatile component 30A which cannot make nonvolatile. Therefore, the volatile component 30A which cannot make nonvolatile is put into a desired operation state or a standby state, transmission/reception of normal data is carried out between the normally-off computer 20C and the volatile component 30A which cannot make nonvolatile after resuming. It is therefore possible to prevent the whole of the combined system 10C from causing an error due to mistaken transmission of data. Inasmuch as the resume program (the return program) of the volatile component 30A is stored in the nonvolatile memory 220 of the normally-off computer 20C, execution from return is rapid and it does not fail a high-speed return characteristic being a characteristic of the normally-off computer 20C even the combined system 10C.

Example 4

Now, the description will proceed to a normally-off computer according to a fourth example of this invention.

The normally-off computer according to the fourth example of this invention is similar in structure and operation to the combined system illustrated in FIG. 6 except that the nonvolatile CPU 210 comprises a plurality of nonvolatile CPU cores (not shown).

In a case of the normally-off computer comprising the plurality of nonvolatile CPU cores, in a similar to the above-mentioned third example, the nonvolatile CPU 210 allocates, to the nonvolatile memory 220, a memory area for controlling and monitoring access for the respective volatile devices and the nonvolatile CPU 210 inhibits access for the volatile device 30A where failure of access is set.

In parallel with execution of the return program by a nonvolatile CPU core, it is possible to resume execution of the program code which has been executed before returning from the turning-off of the power supply due to another nonvolatile CPU core before all of the return of the volatile devices is completed, and it is therefore possible to improve a sensory speed of the return for a user.

Now, the description will be proceed to advantageous effects of the fourth example of this invention.

Until resuming from a program code before coming a stop after returning from the turning-off of the power supply of the normally-off computer 20, the normally-off computer executes the resume program (the return program) in accordance with a characteristic of operation of the volatile component which cannot make nonvolatile. Therefore, the volatile component which cannot make nonvolatile is put into a desired operation state or a standby state, transmission/reception of normal data is carried out between the normally-off computer and the volatile component which cannot make nonvolatile after resuming. It is therefore possible to prevent the whole of the combined system from causing an error due to mistaken transmission of data. Inasmuch as the resume program (the return program) of the volatile component is stored in the nonvolatile memory of the normally-off computer, execution from return is rapid and it does not fail a high-speed return characteristic being a characteristic of the normally-off computer even the combined system.

While the invention has been particularly shown and described with reference to exemplary embodiments thereof, the invention is not limited to these embodiments. It will be understood by those of ordinary skilled in the art that various changes in form and details may be made therein without departing from the sprit and scope of the present invention as defined by the claims.

REFERENCE SIGNS LIST 10A, 10B, 10C combined system
12 power supply switch
14 power supply
20A, 20B, 20C normally-off computer (computation processing device)
210 nonvolatile CPU (central processing unit)
212 nonvolatile register
220, 220A nonvolatile memory (nonvolatile storage unit)
222 program
224 data
226-$i$ return program
226-(1-1), 226-(2-1), 226-($m$-$n$) return program
228, 228A return program control program
230 internal potential monitoring device (inspection unit)
240 DAM module (transferring unit)
250 return timing managing unit (monitoring unit; detection unit)
260 processing unit
30-$i$ input/output device (volatile component; volatile device)
30-1~30-$m$ input/output device (volatile component, volatile device)
30A volatile component (volatile device)
310 processing unit
312 volatile register
320 internal potential monitoring device
40-$i$ connection unit
40-1~40-$m$ connection unit
40A interface
40B input port (terminal)

This application is based upon and claims the benefit of priority from Japanese patent application No. 2013-061982, filed on Mar. 25, 2013, the disclosure of which is incorporated herein in its entirety by reference.

The invention claimed is:

1. A computation processing device which comprises nonvolatile registers and which is able to continue processing data retained in the computation processing device after a power supply is turned off/on without retracting the data to an external device, the computation processing device comprising at least:
a central processing unit including the nonvolatile registers;
a plurality of connectors for each of a respective plurality of volatile components, each of the volatile components configured to save internal information in a volatile storage element thereof;
a nonvolatile storage configured to store a program and data so as to serve as a main memory and configured to save a plurality of return programs corresponding to the plurality of volatile components, each of the plurality of return programs to resume from a turning-off state of the power supply in a respective one of the volatile components; and
a power supply voltage monitor configured to notify that a potential of the power supply in the computation processing device has reached an operation potential at a time of return,
wherein the central processing unit loads the return program from the nonvolatile storage in response to a notification signal from the power supply voltage monitor and executes the return program,
and
wherein the plurality of return programs are equal in number to or less than the plurality of volatile components.

2. The computation processing device as claimed in claim 1, wherein the central processing unit comprises the nonvolatile registers without including volatile registers.

3. The computation processing device as claimed in claim 1, wherein the central processing unit executes a predetermined processing according to an instruction and data which are stored in the nonvolatile storage.

4. The computation processing device as claimed in claim 1, further comprising a transferring circuit having a function for transferring data, wherein the transferring circuit autonomously transfers, in response to a signal, from the power supply voltage monitor, which notifies that the potential of the power supply has reached the operation potential, data saved in the nonvolatile storage to the plurality of connectors.

5. The computation processing device as claimed in claim 1, further comprising a monitoring circuit configured to monitor an executing state of a first return program of a first volatile component of the plurality of volatile components, wherein the central processing unit prohibits access for a particular volatile component which is scheduled to execute or executes the first return program after turning-off of the power supply without access necessary to execution of the first return program until a time when the central processing unit receives, from the monitoring circuit, a signal indicative of completion of execution of the first return program.

6. The computation processing device as claimed in claim 1, further comprising a detection circuit configured to notify that execution of the plurality of return programs reaches completion entirely, wherein the central processing unit does not resume the processing executed by the central processing unit before turning-off of the power supply until the a time then the central processing unit receives, from the detection circuit, a signal notifying that execution of the plurality of return programs reaches completion.

7. The computation processing device as claimed in claim 1, wherein each connector has a terminal which receives a signal notifying a state of an operation voltage within each respective volatile component, wherein the central processing unit prohibits access to a particular volatile component and execution of an associated return program for a duration where the operation voltage within the particular volatile component does not reach a predetermined threshold voltage.

8. A method of controlling the computation processing device as claimed in claim 1, the method comprising:

saving, in the nonvolatile storage, a plurality of associated return programs for one volatile component in accordance with a state of return; and selectively loading and executing, in the central processing unit, a specific return program from the plurality of associated return programs in accordance with a state of return.

9. The method as claimed in claim 8, wherein the central processing unit selectively loads and executes the specific return program from the plurality of associated return programs that is able to return at the shortest time interval.

10. A method of controlling the computation processing device as claimed in claim 1, the method comprising:

saving, in the nonvolatile storage, a plurality of return programs P(i, j) for a volatile component i in accordance with a state j of return, a plurality of return programs P(k, 1) for another volatile component k in accordance with a state 1 of return, and a whole state control program, for a state of the computation processing device to be returned, that selects and controls one return program for returning each volatile component into a suitable state;

loading and executing, in the central processing unit, the whole state control program from the nonvolatile storage at a time of return.

11. The method as claimed in claim 10, wherein, at a time of return, the central processing unit selects, in accordance with a result of the return program P(i, j) for the volatile component i that previously executes, an optimum return program from the plurality of return programs P(k, 1) for the other volatile component k.

12. The method as claimed in claim 10, comprising:

saving, in the nonvolatile storage, return programs assigned with priorities in accordance with states of return of the respective return programs; and loading and executing, in the central processing unit, the return programs from the nonvolatile storage in accordance with the priorities at a time of return.

13. The method as claimed in claim 10, comprising loading and executing, in the central processing unit, the return program P(i, j) for the volatile component i that has the longest return time interval on a priority basis at a time of return.

* * * * *